United States Patent [19]

Tsukada

[11] Patent Number: 5,347,340
[45] Date of Patent: Sep. 13, 1994

[54] CAMERA HAVING A FOCUS DETECTION DEVICE AND INTERCHANGEABLE LENS

[75] Inventor: Shinichi Tsukada, Toride, Japan
[73] Assignee: Nikon Corporation, Tokyo, Japan
[21] Appl. No.: 136,108
[22] Filed: Oct. 14, 1993
[30] Foreign Application Priority Data Oct. 15, 1992 [JP] Japan ................................ 4-277354

[51] Int. Cl.⁵ ............................................ G03B 13/36
[52] U.S. Cl. ................................................... 354/402
[58] Field of Search ........................................ 354/402

[56] References Cited

U.S. PATENT DOCUMENTS 4,812,868  3/1989  Utagawa et al. .................... 354/402
4,878,079  10/1989  Hamada et al. ..................... 354/402

FOREIGN PATENT DOCUMENTS

62-189415  8/1987  Japan .
62-227108  10/1987  Japan .
63-47711   2/1988  Japan .
1-221710   9/1989  Japan .
1-221713   9/1989  Japan .
2-18509    1/1990  Japan .

*Primary Examiner*—William B. Perkey

[57] ABSTRACT

A focus detection device for a camera which corrects the focal point position of an interchangeable camera lens. The focal point position is corrected according to data indicating interchangeable lens characteristics, and according to data indicating characteristics of a focus detection device. The data indicating characteristics of the interchangeable lens is data representing the field curvature of the interchangeable lens which is stored in a memory located in the interchangeable lens. The data indicating characteristics of the focus detection device is data representing the size of a detection aperture of the focus detection device, a direction of detection, and a position of the detection region within a photographic image surface. This data is stored in a memory located in the camera. Reliable focal point correction may be performed when the interchangeable lens is mounted on a camera loaded with a focus detection device having optional detection aperture size, detection direction, and detection position. Furthermore, the quantity of data which has to be stored in the memory of the interchangeable lens is decreased. Focal point correction for an interchangeable lens may also be performed when plural focus detection devices in the camera perform focal point detection in plural detection regions.

18 Claims, 7 Drawing Sheets

FIG. 7 TELEPHOTO LENS

FIG. 8 WIDE ANGLE LENS

FIG. 9

| TYPE A LENS | STOP OPENING | | APERTURE F VALUE 8 | |
|---|---|---|---|---|
| | R | T | R | T |
| 4TH POWER COEFFICIENT | $k_{Rm4}$ | $k_{Tm4}$ | $k_{R84}$ | $k_{T84}$ |
| 2D POWER COEFFICIENT | $k_{Rm2}$ | $k_{Tm2}$ | $k_{R82}$ | $k_{T82}$ |
| 0 POWER COEFFICIENT | $k_{m0}$ | — | $k_{80}$ | — |

FIG. 10

| TYPE B LENS | STOP OPENING | | APERTURE F VALUE 4 | | APERTURE F VALUE 8 | |
|---|---|---|---|---|---|---|
| | R | T | R | T | R | T |
| 4TH POWER COEFFICIENT | $k_{Rm4}$ | $k_{Tm4}$ | $k_{R44}$ | $k_{T44}$ | $k_{R84}$ | $k_{T84}$ |
| 2D POWER COEFFICIENT | $k_{Rm2}$ | $k_{Tm2}$ | $k_{R42}$ | $k_{T42}$ | $k_{R82}$ | $k_{T82}$ |
| 0 POWER COEFFICIENT | $k_{m0}$ | — | $k_{40}$ | — | $k_{80}$ | — |

CAMERA HAVING A FOCUS DETECTION DEVICE AND INTERCHANGEABLE LENS

BACKGROUND OF THE INVENTION

1. Field of the Invention

The present invention relates to a focus detection device for a camera which corrects the focal point position of an interchangeable lens in accordance with the characteristics of the interchangeable lens and the characteristics of the focus detection device.

2. Description of the Related Art

Figure 11:
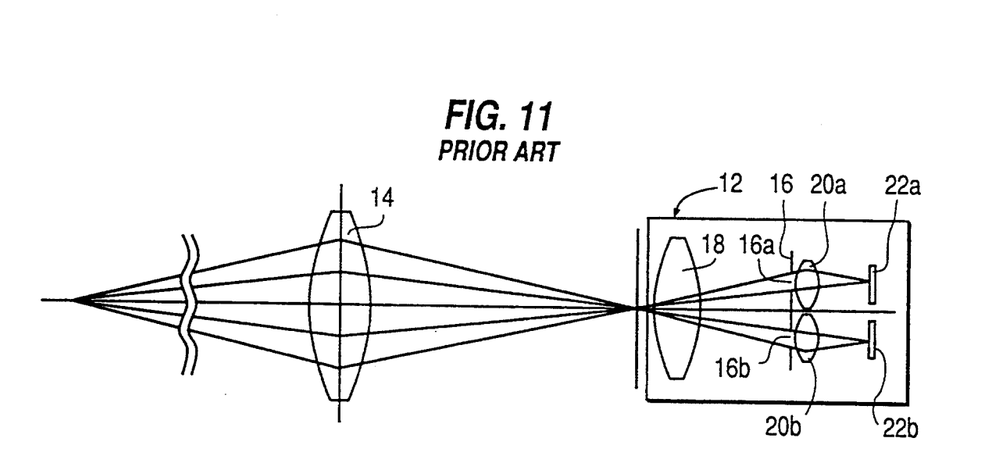
FIG. 11 is a schematic view of a prior art type of focus detection device for a camera.
Figure 12:
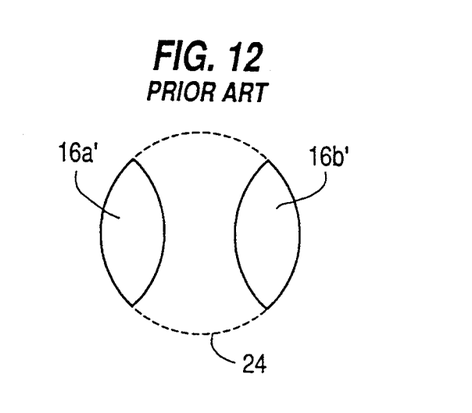
FIG. 12 is a diagram showing the aperture size of the prior art type focus detection device shown in FIG. 11.

Cameras which have a focal point position correction function for interchangeable lenses are known. For example, FIG. 11 shows a prior art type of focus detection device 12 which is used in a camera with an interchangeable lens. The focus detection device 12 is known as a positional difference type focus detection device because a focal point is detected based upon the difference in the imaging positions of two partial beams. In operation, two partial beams are derived from an exit beam of an interchangeable lens 14. In order to derive the two partial beams, the exit beam of the interchangeable lens 14 is focused on a converter lens 18 which directs the exit beam to a stop mask 16 having two detection apertures 16a, 16b. The size of a detection aperture is shown by the dotted line 24 in FIG. 12, and two entry pupils 16a', 16b ' are also shown. The beams directed through the apertures 16a, 16b are focussed by re-imaging lenses 20a and 20b onto minute one-dimensionally arrayed photoelectric elements (CCDs, etc.) 22a and 22b, respectively. The one-dimensionally arrayed photoelectric elements 22a, 22b detect the distribution of light intensity in their array direction, and in a direction perpendicular to the array in order to determine a focal point. In general, the direction of the arrays 22a, 22b and the direction of the mask apertures 16a, 16b are in agreement. The directions of the mask apertures 16a, 16b and the directions perpendicular to the mask apertures 16a, 16b are known as the focus directions.

In these types of cameras, an F value (which will also be referred to below as the aperture equivalent F value) refers to the size of a detection aperture in a focus detection element of the device. When a lens is substituted, and the F value of the substituted lens is equal to the F value of the focus detection element, focal point position correction is performed without problems. However, for example, when the F value of the focus detection element is set to 4, and the substituted lens has an F value of 2, at the moment of photography the resulting focal point position obtained from the focus detection element is displaced from the ideal focal point position.

In order to correct for the displacement in focal point position, prior art cameras have stored a correction value in a memory in the lens. For example, Japanese Laid-Open Patent Application 62-227108 ("JP-A-62-227108") discloses a camera wherein an F value correction quantity is stored in an interchangeable lens, and during focus detection by a focus detection device, the F value correction quantity is read out and the focal point position is corrected using the correction quantity.

However, when the F value correction quantity stored in the interchangeable lens corresponds to an aperture equivalent F value which differs from the aperture equivalent F value of the focus detection element, focal point correction will not be performed successfully. By way of example, when a camera has a focus detection element having an aperture equivalent F value of 8, and an interchangeable lens mounted on the camera has an F value correction quantity (the open aperture F4 difference) stored in the interchangeable lens corresponding to a focus detection element having an aperture equivalent F value of 4 (for example, a 50 turn/1.4 standard lens), focal point correction will not be performed successfully even though focus detection is performed.

In order to overcome the above-noted problem, in JP-A-62-227108, two or more F value correction quantities, for example, open aperture F4 difference and open aperture F8 difference, are stored in the interchangeable lens. When the interchangeable lens is mounted on a camera body having a focus detection element whose aperture equivalent F value is not 4 or 8, for example, a focus detection element having an F value of 5.6, an approximate correction value is calculated from the stored aperture F4 difference and aperture F8 difference. The approximate correction value may be calculated according to the formula:

$$0.5 \cdot (\text{open aperture F4 difference} + \text{open aperture F8 difference}) = \text{approximate correction value}.$$

By using the calculated approximate correction value as the correction quantity, focal point correction becomes possible for optional combinations of interchangeable lenses and cameras.

However, in the prior art camera disclosed in JP-A-62-227108, the focus detection region is restricted to the vicinity of the photographic optical axis, and appropriate focal point correction becomes impossible away from the optical axis. Techniques are known for performing focal point correction with a focus detection element, wherein a region away from the photographic optical axis of a photographic field is used as a focal detection region. An example of such a technique is disclosed in Japanese Laid-Open Patent Publication 62-189415 ("JP-A-62-189415").

Figure 3:
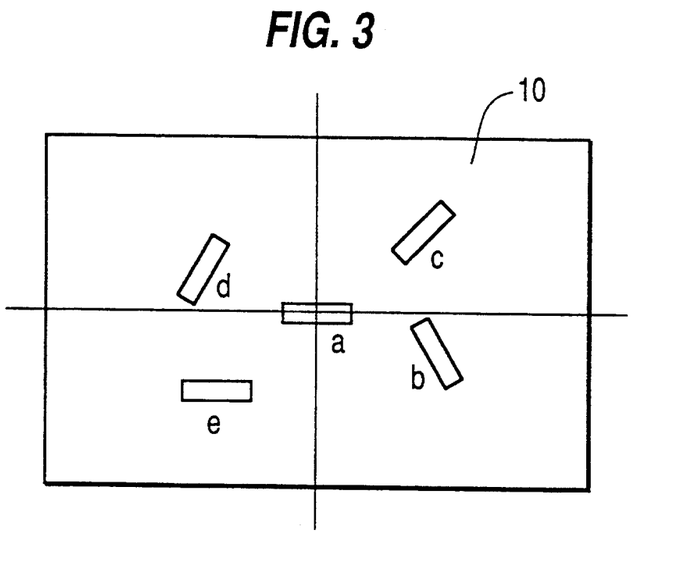
FIG. 3 is a diagram showing various focus detection regions within a photographic image surface.

According to JP-A-62-189415, the focal point correction quantity for focus detection elements having different focus detection positions and detection directions is stored in an interchangeable lens. In general, even in the same kind of interchangeable lens, the focal point correction quantity will differ in accordance with the position and direction of detection in a photographic field of a focus detection region for the focus detection element. For example, FIG. 3 illustrates detection regions a, b, c, and d shown by rectangles in a photographic field 10. The directions of the long axes of the rectangles are the detection directions of the rectangles, and the centers of the rectangles are the detection positions. If the detection regions of an interchangeable lens (for example, a 50 mm/1.4 standard lens) are a, b, c, and d, the respective focal point correction quantities ha, hb, hc, and hd relative to the focus detection element are previously stored in the interchangeable lens. When the detection region is b, and focus detection is performed, the focus detection element performs focal point correction by selectively reading hb from the interchangeable lens mounted on the camera body.

However, when the interchangeable lens is mounted on a camera body having a focus detection element with a detection region e which is different from regions a, b, c and d, as shown in FIG. 3, focal point correction can not be performed because the focal point correction quantity he relative to the detection region e is not stored in the interchangeable lens. Furthermore, although the correction quantity he may be stored in the interchangeable lens, since camera bodies normally differ and focus detection elements also differ, the quantity of storage required in the interchangeable lens increases.

Additionally, when a new camera body is developed, design limitations arise because the detection region of the focus detection element has to be loaded with the focal point correction quantity stored in the interchangeable lens. Even in the same kinds of interchangeable lenses, because the size of the detection aperture of the focus detection element will differ according to the detection position and detection direction, the amount of data relating to the focal point correction quantity which has to be stored in the interchangeable lens is still further increased.

SUMMARY OF THE INVENTION

It is therefore an object of the present invention to provide a camera which is capable of accommodating interchangeable lenses.

It is a further object of the present invention to provide a camera which performs focal point position correction.

Another object of the invention is to provide a camera which performs focal point position correction for an interchangeable lens according to data representing interchangeable lens characteristics and according to data representing focus detection element characteristics.

It is a further object of the present invention to provide a camera which performs focal point position correction for an interchangeable lens based upon data representing the field curvature of the interchangeable lens, and based upon data representing the size of a detection aperture of the focus detection device, a direction of detection, and a position of a detection region.

Yet a further object of the present invention is to provide a camera which performs focal point position correction for an interchangeable lens which stores data representing the field curvature of the interchangeable lens in a memory built into the lens.

It is still a further object of the present invention to provide a camera which performs focal point position correction for an interchangeable lens wherein the data quantity stored in the lens memory is very small.

It is yet another object of the present invention to provide a camera which performs focal point position correction for an interchangeable lens which can perform reliable focal point correction, even when the lens is mounted on a camera with a focus detection element having an optional size of the detection aperture, detection direction and detection position.

The above objects are achieved by providing a camera which includes an interchangeable lens mounted on the camera, and a focus detection element located in the camera which performs focus detection for a detection region and which outputs a focal point position for that detection region. A lens memory built into the interchangeable lens stores data representing a field curvature of the interchangeable lens, and a memory located in the body of the camera stores data representing characteristics of the focus detection element. A correction unit corrects the focal point position of the interchangeable lens based upon the data stored in the interchangeable lens and the data stored in the memory in the camera.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

The present inventors have discovered certain relationships, as described in greater detail below, between the field curvature of an interchangeable lens and the focal point output from a focus detection element. Before stating these relationships, the field curvature will be described below.

Figure 4:
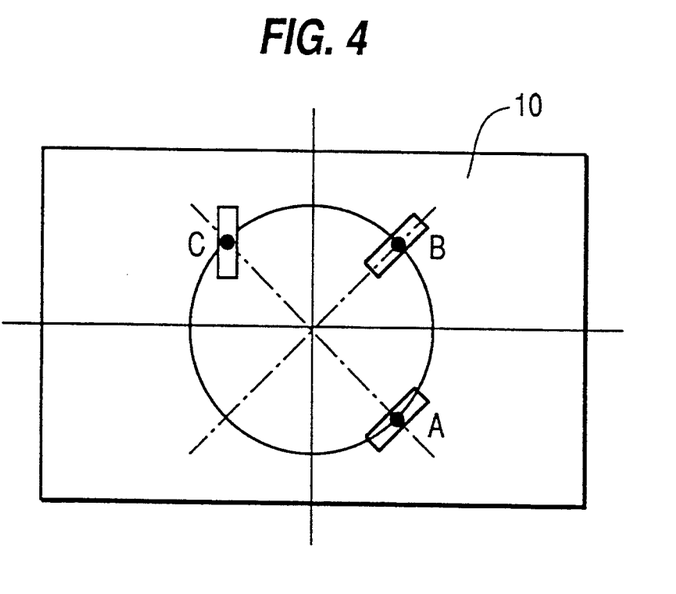
FIG. 4 is a diagram showing various image points and the directions of spatial frequencies within the photographic image surface.

The field curvature is defined by connected field positions where the modulated transfer function (MTF) for a predetermined spatial frequency (a frequency range of approximately 30/mm or more, generally in the range 10–50/mm) at each image height becomes a peak. The image height is defined as the distance from the photographic optical axis to an image point within a photographic image surface. More specifically, as seen in FIG. 4, image point A and image point B, with the photographic optical axis as center, are points on the same circle. The image heights of image point A and image point B are the same. Furthermore, in general, an interchangeable lens has rotational symmetry relative to the photographic optical axis, and the imaging capacity of the interchangeable lens is equal at image points having the same image height.

When referring to the MTF of an interchangeable lens, it is generally understood to mean a one-dimensional MTF, so that even at the same image height, if the direction of the spatial frequency differs, the value of the MTF differs. For purposes of the present invention, two directions among the directions of the spatial frequency are important: specifically, the radial direction and the tangential direction of the spatial frequency. FIG. 4 shows the radial and tangential directions of the spatial frequency at image points A and B, respectively. The radial direction of the spatial frequency is shown by the direction of the long axis of the rectangle surrounding image point A. The long axis of the rectangle surrounding point A is perpendicular to the line joining the image point A and the photographic optical axis. The tangential direction of the spatial frequency is shown by the direction of the long axis of the rectangle surrounding image point B. The long axis direction of the rectangle surrounding image point B is in the same direction as the line joining the image point B and the photographic optical axis. Image point C shows a direction which is intermediate between the radial direction and the tangential direction.

The values of the MTF for the directions of the spatial frequency of image points A, B and C are MA, MB and MC, respectively. Further, while in general image point A, image point B, and image point C are at the same image height, MA≠MB≠MC. Therefore, since the value of the MTF varies, in general the field curvature also varies according to the direction of the spatial frequency. Of course, since the field curvature is a characteristic of the interchangeable lens, if the interchangeable lens is changed the field curvature will also change.

Figure 5:
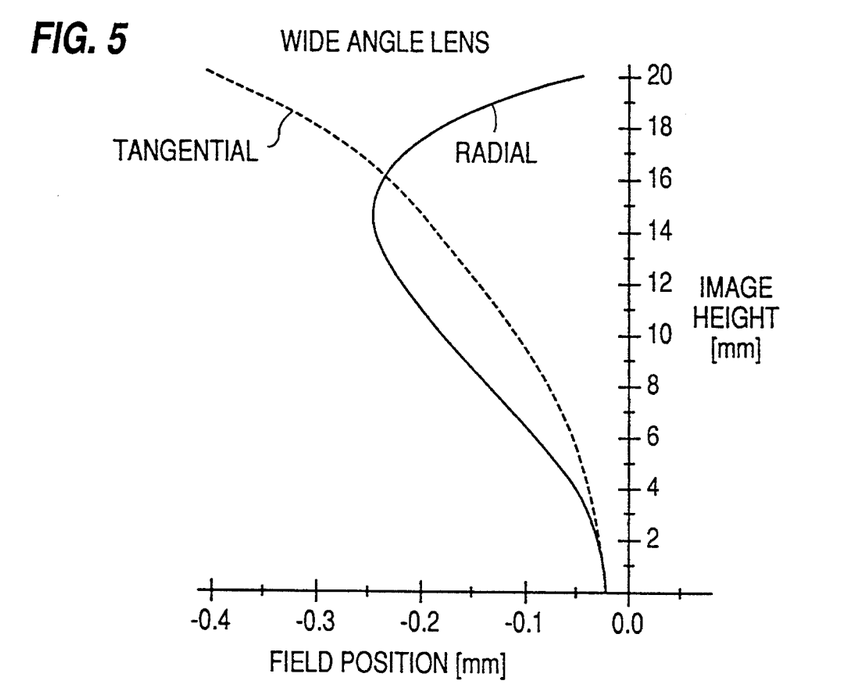
FIG. 5 is a graph showing the field curvature of a wide angle lens in the radial and tangential directions.
Figure 6:
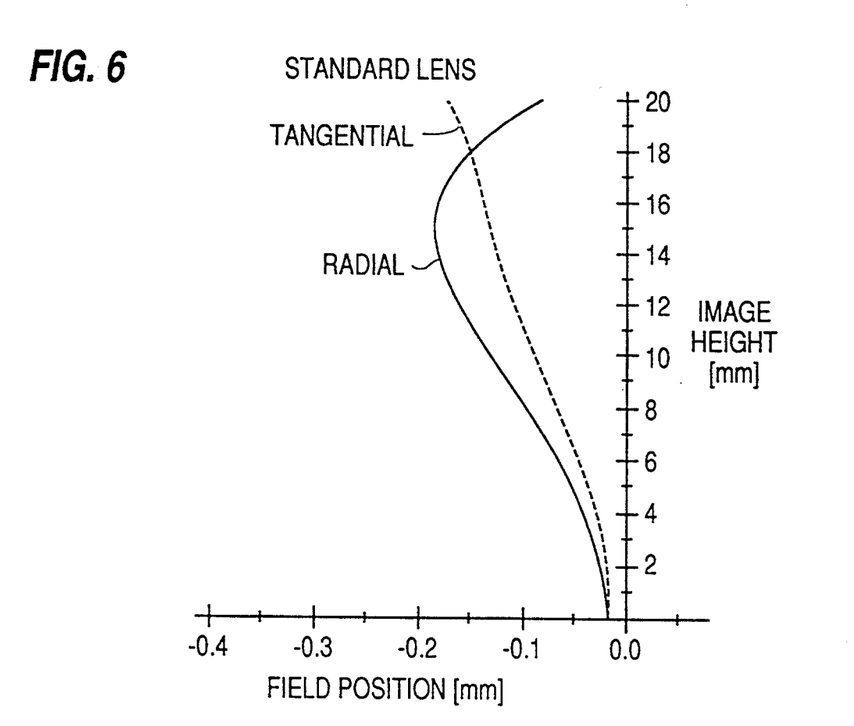
FIG. 6 is a graph showing the field curvature of a standard lens in the radial and tangential directions.
Figure 7:
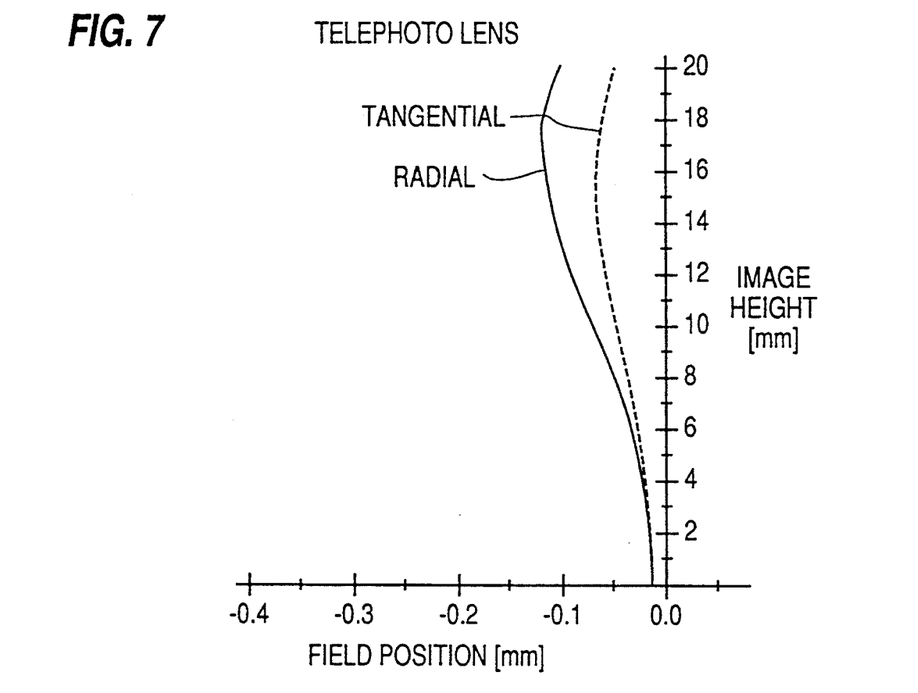
FIG. 7 is a graph showing the field curvature of a telephoto lens in the radial and tangential directions.
Figure 8:
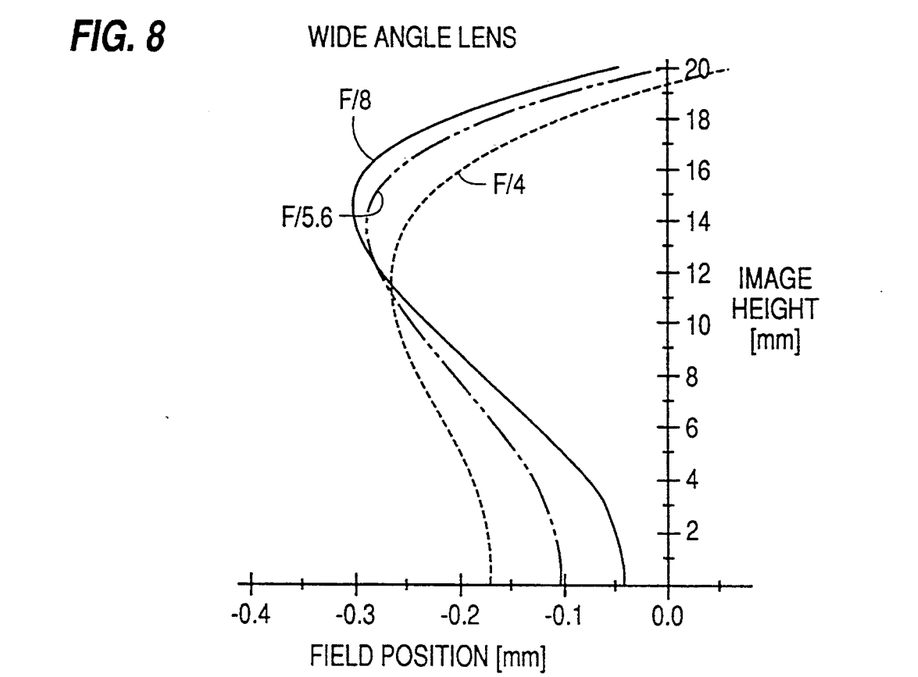
FIG. 8 is a graph showing the field curvature for different aperture F values of a wide angle lens.

FIGS. 5, 6 and 7 are graphs which show the field curvatures in the radial and tangential directions for an aperture F8 of a representative wide angle lens, standard lens, and telephoto lens, respectively. FIG. 8 shows the field curvature in the radial direction at different stop values (aperture F value 4, 5.6 and 8) of the wide angle lens of FIG. 5. In FIGS. 5–8, the image height is graphed on the ordinate, and the field position is graphed on the abscissa. Moreover, the origin of the abscissa is the paraxial field position of the principal wavelength (for example, d line), but the position of the origin of the abscissa is essentially unrelated to the field curvature. From FIGS. 5–8, it can be seen that the field curvature varies according to the kind of interchangeable lens, the direction of the spatial frequency, and the state of the stop (aperture F value).

The inventors have discovered that when the size of the detection aperture of the focus detection element and the size of the stop aperture of the interchangeable lens are equal, then all of (1) the focal point position output from the focus detection element, (2) the field curvature in the detection direction of the focus detection element and the like direction of spatial frequency, (3) the position within the photographic field of the detection region of the focus detection element, and (4) the values at like image height, agree with good accuracy.

However, at the time of photography, the size of the stop aperture of the interchangeable lens is not limited to the size of the aperture of the focus detection element. Generally, at the time of photography the stop aperture size of the interchangeable lens and the aperture size of the focus detection element are different. Accordingly, focal point correction is necessary. This correction becomes possible by storing data to represent the field curvature for plural stop states in the interchangeable lens.

As is well known, the field position where the MTF of a predetermined spatial frequency becomes a peak represents the ideal field. Furthermore, as described above, field curvature means the connected field positions where the MTF of the predetermined spatial frequency at each image height becomes a peak. Thus, the peak position output from the focus detection element, when the size of the stop aperture of the interchangeable lens is the same as the size of the aperture of the focus detection element, becomes the ideal field position.

As described above, the field curvature becomes different according to the direction of the spatial frequency. The present inventors have found that the field curvature $f_n(y)$ for an optional aperture F value n of an interchangeable lens, at an optional image height y, and an optional direction of spatial frequency, using the field curvature $Rf_n(y)$ in the radial direction of spatial frequency, and field curvature $Tf_n(y)$ in the tangential direction of spatial frequency, is approximated by $$f_n(y) \approx \gamma \cdot Rf_n(y) + (1-\gamma) \cdot Tf_n(y) \tag{1}$$

Here $\gamma$ when the spatial frequency is displaced through an angle $\Theta$ from the radial direction, is $$\gamma = (1 - \sin[2 \cdot \Theta + \{\pi/2\}])/2 \tag{2}$$

Because the radial and tangential directions are orthogonal, $\Theta = \pi/2$ becomes the tangential direction. Accordingly, if only the field curvature data for both the radial and the tangential directions are stored in the interchangeable lens, it is possible to calculate the field curvature for an optional direction from these two data.

Furthermore, the present inventors have found that, regardless of the aperture F value of interchangeable lens, and the direction of the spatial frequency, the field curvature can be approximated by the following polynomial which is a function of the image height, y:

$$f_n(y) \approx k_{n4} \cdot y^4 + k_{n2} \cdot y^2 + k_{n0} \tag{3}$$

Accordingly, the field curvature may be stored using only three coefficients, $k_{n4}$, $k_{n2}$, and $k_{n0}$. As described above, if the aperture F value of the interchangeable lens changes, the field curvature also changes. However, using a method similar to that disclosed in the above-mentioned JP-A-62-227108, by storing field curvatures for plural characteristic aperture F values, field curvatures for aperture F values other than those stored may be approximated.

For example, by storing the field curvature $f_4(y)$ for the aperture F value 4, and the field curvature $f_8(y)$ for the aperture F value 8 (here the field curvature may be considered either in the radial direction or in the tangential direction), the field curvature for the aperture F value 5.6 is approximately $$f_{5.6}(y) \approx 0.5 \cdot (f_4(y) + f_8(y)) \tag{4}$$

The present inventors have also empirically determined that, in an interchangeable lens having a stop aperture of aperture F value m which is greater than 2.8 (termed a type A lens hereinbelow), it is sufficient to store the field curvature $f_m(y)$ at the stop opening (aperture F value m) and the field curvature $f_8(y)$ at the aperture F value of 8. The field curvature $f_n(y)$ when the aperture F value is n is then approximated by $$f_n(y) \approx [log_2(8/n) \cdot f_m(y) + log_2(n/m) \cdot f_8(y)] / log_2(8/m) \tag{5}$$

Furthermore, for an interchangeable lens having a stop aperture of aperture F value 2.8 and less (termed a type B lens hereinbelow), it has been empirically determined to be sufficient to store the field curvature $f_m(y)$ at the stop opening (aperture F value m) and the field curvature $f_4(y)$ at an aperture F value 4, and the field curvature $f_8(y)$ at the aperture F value 8. The field curvature $f_n(y)$ at this time for the aperture F value n where $m < n < 4$ is approximated by $$f_n(y) \approx [log_2(4/n) \cdot f_m(y) + log_2(n/4) \cdot f_8(y)] \qquad (6).$$

For a type A lens, the 4 field curvatures $$Rf_m(y), Tf_m(y), Rf_8(y), Tf_8(y) \qquad (7)$$

are stored (where R and T denote the radial and tangential directions, respectively), and for a type B lens, 6 field curvatures are stored $$Rf_m(y), Tf_m(y), Rf_4(y), Tf_4(y), Rf_8(y), Tf_8(y) \qquad (8).$$

Since one image curvature can be represented by a polynomial using 3 coefficients, in a type A lens a total of 12 coefficients are stored, and in a type B lens a total of 18 coefficients are stored. At the image height $y=0$, specifically on the optical axis, the radial and tangential directions are the same, and the field curvature in the radial direction can be represented by the polynomial $$Rf(y) = k_{R4} \cdot y^4 + k_{R2} \cdot y^2 + k_{R0} \qquad (9).$$

The field curvature in the tangential direction is represented by the polynomial by $$Tf(y) = k_{T4} \cdot y^4 + k_{T2} \cdot y^2 + k_{T0} \qquad (10),$$

where $$k_{R0} = K_{T0} \qquad (11).$$

Figure 9:
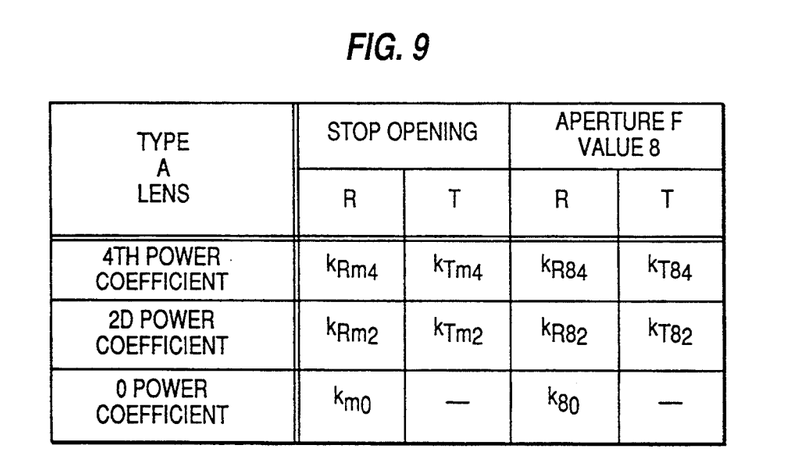
FIG. 9 is a table showing the data stored in a lens memory of an interchangeable lens which is a type A lens.
Figure 10:
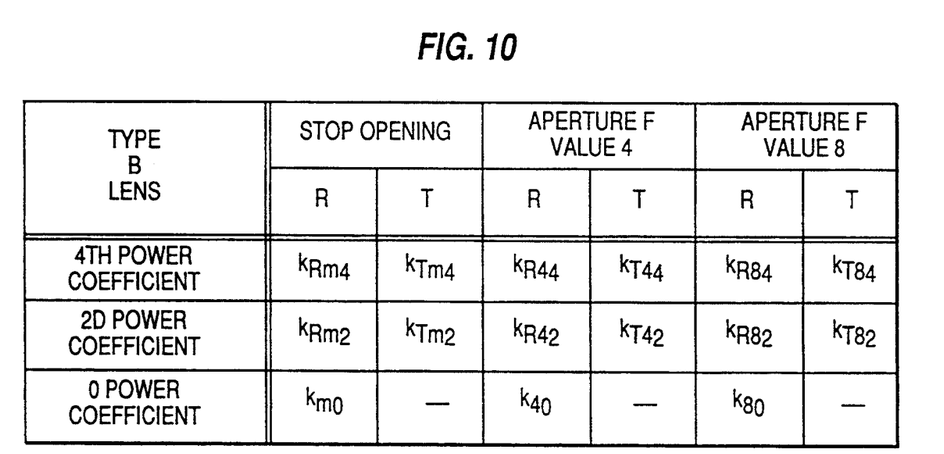
FIG. 10 is a table showing the data stored in the lens memory of an interchangeable lens which is a type B lens.

Accordingly, in the case of a type A lens, as shown in the table of FIG. 9, only 10 items of data need to be stored, and in the case of a type B lens, as shown in the table of FIG. 10, only 15 items of data need to be stored.

Figure 1:
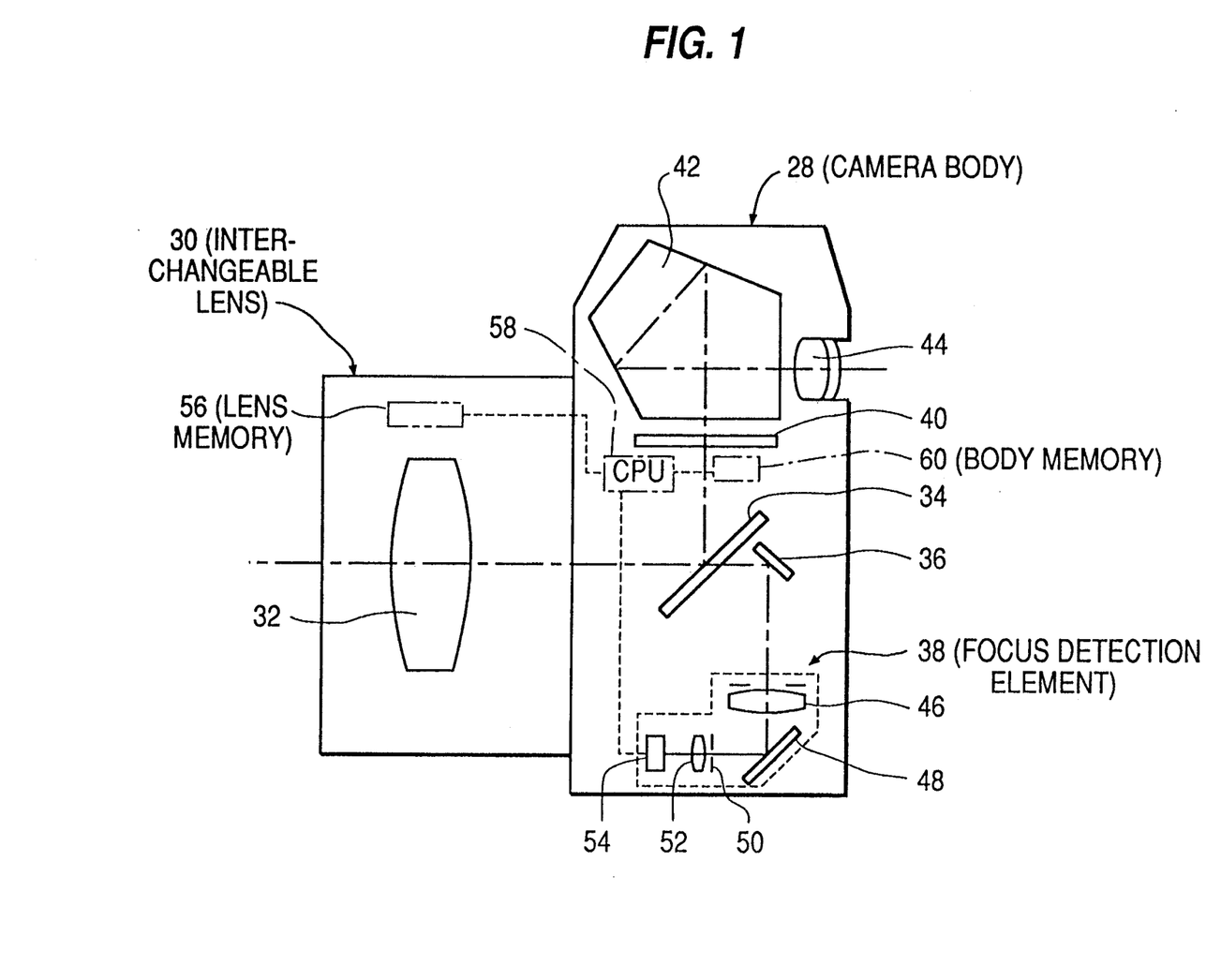
FIG. 1 is a side view of a camera having a focus detection device according to a first embodiment of the present invention.

Referring now to FIG. 1, an apparatus for performing focus correction in a camera equipped with an interchangeable lens according to a first embodiment of the present invention is shown. The apparatus shown in FIG. 1 performs focal point correction in accordance with the principles described above. As seen in FIG. 1, an interchangeable lens 30 is installed, freely demountable, on a camera body 28. The interchangeable lens 30 includes a photographic lens 32. Light from a photographic subject enters the interchangeable lens 30 and passes through the photographic lens 32. A portion of the light which has passed through photographic lens 32 then passes through a transparent portion of a movable mirror 34, and is reflected downward by an auxiliary mirror 36, which is fixed in relation to the movable mirror 34. The portion reflected downward by auxiliary mirror 36 enters a focus detection element 38.

A portion of the light reflected from the photographic subject which has passed through photographic lens 32 is reflected by the movable mirror 34, and passes through a viewfinder screen 40. The light is then reflected through a pentaprism 42 of the viewfinder, and, after being reflected through the pentaprism 42, the light passes to a photographer's eye through an eyepiece 44.

Interchangeable lens 30 includes a lens memory 56 which stores data indicating characteristics of the interchangeable lens 30. The lens memory 56 is connected to a CPU 58 located in the camera body 28 which performs control of the whole camera. Furthermore, a body memory 60 located in the camera body 28 stores data indicating characteristics of the focus detection element 38, such as the size of the detection aperture, the detection position, and the detection direction. The body memory 60 is also connected to the CPU 58.

Further, the focus detection element 38 includes a converter lens 46, a mirror 48, a stop 50, a re-imaging lens 52 and light receiving element 54. The focus detection element 38 is constructed similar to the focus detection element shown in FIG. 9.

According to this embodiment, in the focus detection element 38, the size of the detection aperture (represented by an F value) is a, the detection position (detection image height) is y, and the detection direction (the angular deflection from the radial direction) is $\Theta$. The values of a, y, and $\Theta$ are stored in the body memory 60.

Moreover, in this embodiment, if the interchangeable lens 30 is a type A lens (described above), then the lens is such that a stopped-down photograph is taken of the photographic subject with an aperture F value n of the interchangeable lens 30. The aperture F value of the interchangeable lens 30 during photography, is either decided by the photographer, or is determined automatically by the camera based on a photometric result. Because this interchangeable lens is a type A lens, the 10 items of data representing the field curvature, as shown in FIG. 9, are stored in the lens memory 56.

Figure 2:
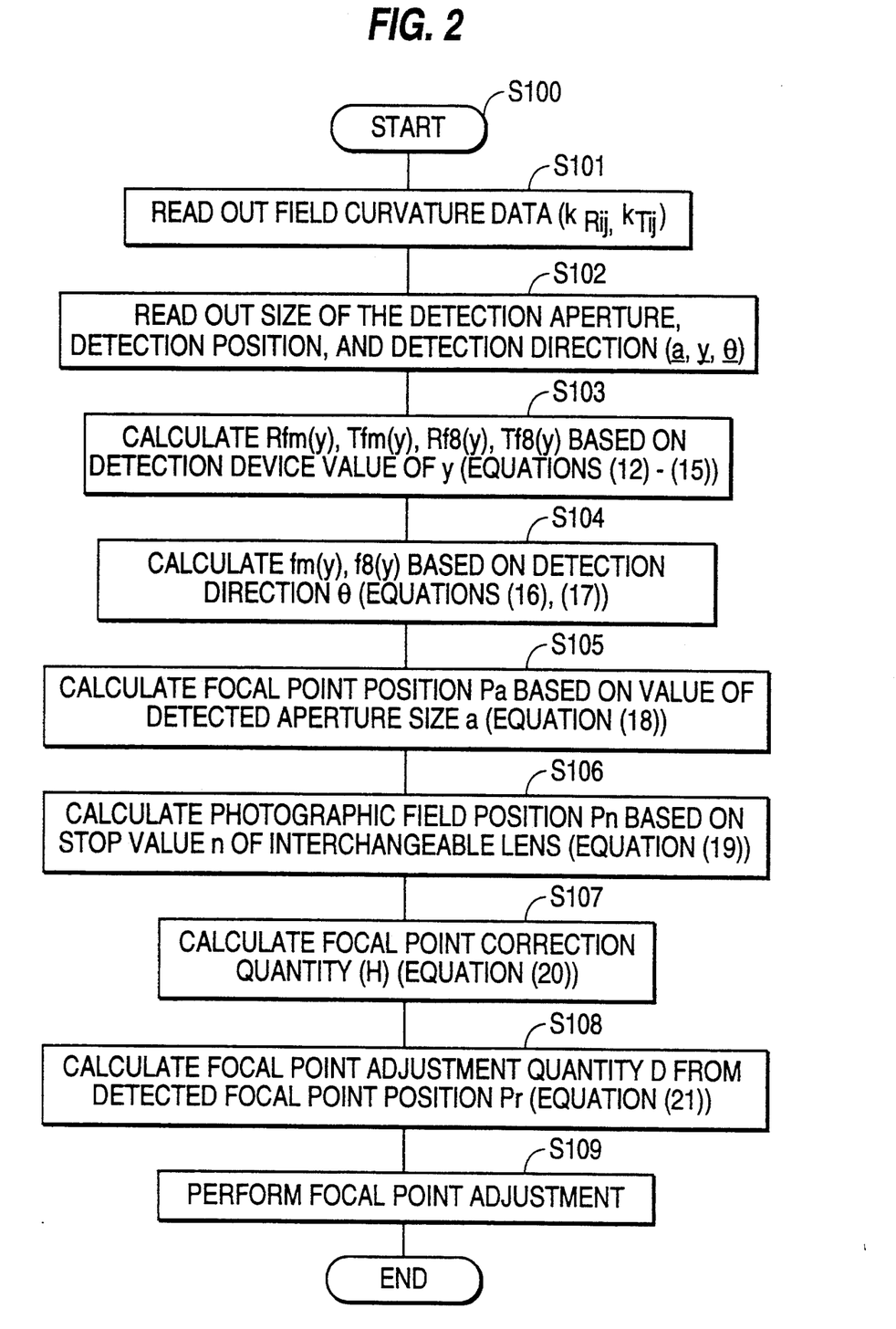
FIG. 2 is a flow chart illustrating a focus correction process for the focus detection device in accordance with the first embodiment of the present invention.

FIG. 2 is a flowchart showing the sequence of operations for performing focal point position correction. First, in step S101, the 10 items of data representing the field curvature are read out from the lens memory 56 of the interchangeable lens 30. Next, in step S102 the values a, y, and $\Theta$ indicating the size of the detection aperture, the detection position, and the detection direction, respectively, are read out from the body memory 60 of the camera body 28.

Proceeding to step S103, values for the field curvature in the radial and tangential directions are calculated based on the value of the detection position y:

$$Rf_m(y) = k_{Rm4} \cdot y^4 + k_{Rm2} \cdot y^2 + k_{m0} \qquad (12),$$

$$Tf_m(y) = k_{Tm4} \cdot y^4 + k_{Tm2} \cdot y^2 + k_{m0} \qquad (13),$$

$$Rf_8(y) = k_{R84} \cdot y^4 + k_{R82} \cdot y^2 + k_{80} \qquad (14),$$

$$Tf_8(y) = k_{T84} \cdot y^{A4} + k_{T82} \cdot y^2 + k_{80} \qquad (15).$$

Continuing in step S104, values for field curvature are then calculated using equation (3) above, based on the values of the detection direction $\Theta$:

$$f_m(y) = \gamma \cdot Rf_m(y) + (1-\gamma) \cdot Tf_m(y) \qquad (16),$$

$$f_8(y) = \gamma \cdot Rf_8(y) + (1-\gamma) \cdot Tf_8(y) \qquad (17).$$

Next, in step S105, a focal point position $P_a$ is calculated based on the size a of the focus detection aperture:

$$P_n = [log_2(8/a) \cdot f_m(y) + log_2(a/m) \cdot f_8(y)] / log_2(8/m) \quad (18).$$

An ideal field position $P_n$ is then calculated in step S106 based on the stop value n of the interchangeable lens 30:

$$P_n = [log_2(8/n) \cdot f_m(y) + log_2(n/m) \cdot f_8(y)] / log_2(8/m) \quad (19).$$

Next, in step S107 the focal point correction quantity H is calculated according to the equation:

$$H = P_n - P_a \quad (20).$$

In step S108 the focal point correction quantity D is calculated according to the equation:

$$D = P_r - H \quad (21),$$

where $P_r$ is the detected focal point position for the photographic subject.

Finally, in step S109 focal point adjustment is performed by shifting the interchangeable lens 30 so as to move the field from its existing position by the focal point adjustment quantity D calculated in step S108.

Thus, in the focus detection device according to the present embodiment, based on the data representing the field curvature of the interchangeable lens 30, the size a of the focus detection aperture, the detection direction Θ and the position y of the detection region in the photographic field, it becomes possible to perform reliable focal point correction when performing focus detection with the interchangeable lens 30 mounted on a camera having a focus detection element 38 loaded with an optional detection aperture size a, detection angle Θ, and detection position y.

Further, according to the first embodiment of the present invention, because the coefficients stored in the lens memory 56 of interchangeable lens 30 are data representing field curvature of the interchangeable lens 30, which field curvature is represented by a polynomial having image height as a variable, it becomes possible to make the data quantity stored in the lens memory 56 of the interchangeable lens 30 very small. Also, since the field curvature for an optional direction is calculated, based on the radial direction and tangential direction of the field curvature of the interchangeable lens 30, the data quantity which is stored in the lens memory 56 of the interchangeable lens 30 may be decreased.

Moreover, according to the first embodiment of the invention, because the field curvature is calculated for an optional actual stop, based on the data representing plural field curvatures for plural stop states of the interchangeable lens 30, it is possible to calculate the field curvature corresponding to the actual stop value without an extreme increase in the quantity of data which is stored in the lens memory 56 of the interchangeable lens 30.

Furthermore, according to the present invention, when the interchangeable lens 30 is installed in a camera equipped with the focus detection device of the present invention, a direct functioning of the focus detection device becomes possible.

According to the first embodiment of the present invention, the ideal field position $P_n$ was determined based on the direction of the focus detection element 38. The present invention is not limited by such an embodiment. For example, the ideal field position may be a position intermediate between the ideal field position of the radial direction and the ideal field position of the tangential direction.

There are many cases wherein an ideal field position is a position intermediate between the ideal field position of the radial direction and the ideal field position of the tangential direction. In these cases, from the formulas $$f_m(y) = 0.5 \cdot [Rf_m(y) + Tf_m(y)] \quad (22),$$

$$f_8(y) = 0.5 \cdot [Rf_8(y) + Tf_8(y)] \quad (23), \text{ and}$$

$$P_n = [log_2(8/n) \cdot f_m(y) + log_2(n/m) \cdot f_8(y)] / log_2(8/m) \quad (24)$$

the correction quantity H becomes:

$$H = P_n - P_a \quad (25).$$

The first embodiment has been described with respect to calculating the correction quantity for a type A lens. However, it will be recognized that the calculations can be made in a similar manner for a type B lens, and a detailed description is omitted.

Furthermore, the first embodiment has been described as having one focus detection element 38 built into the camera body 28. However, according to a second embodiment of the present invention, plural focus detection elements may be employed. In particular, when two focus detection elements are installed, the two focus detection elements are referred to as detection element 1 and detection element 2, and the photographic subject corresponding to the detection position of detection element 1 is photographic subject 1, and that corresponding to detection element 2 is photographic subject 2.

When focus detection of photographic subject 1 is performed by detection element 1, the detected focal point position obtained is $P_r1$, and similarly, when focus detection of photographic subject 2 is performed by detection element 2, the detected focal point position is $P_r2$. At this time, whichever photographic subject is preferentially selected, or in the case in which the photographic subject closer to the camera is selected, the correction quantity is calculated, in a manner similar to the first embodiment, in the detection element corresponding to the selected photographic subject.

When the focal points for the photographic subject 1 and photographic subject 2 are not combined, the characteristic data stored in the memory in the camera body are (a1, y1, Θ1) for detection element 1, and the characteristic data stored for detection element 2 are (a2, y2, Θ2). From these data, the calculated focal point position $P_a1$ for detection element 1, and the calculated focal point position $P_a2$ for detection element 2 are obtained by calculation according to equations (12)–(18). If the aperture F value of the interchangeable lens is n at the time of photography, by means of equations (22)–(24), the calculated ideal focal point position $P'_n1$ of detection element 1, and the calculated ideal focal point position $P'_n2$ of detection element 2 are obtained.

In this manner, if the focal point adjustment of the interchangeable lens is performed by field shifting by D1 from the existing position, where $$D1 = P_n1 - P_a1 \quad (26),$$

a photograph is taken matched to the focal point for photographic subject 1. If the focal point adjustment of the interchangeable lens is performed by field shifting by D2 from the existing position, where $$D2 = P_n2 - P_a2 \quad (27),$$

a photograph is taken matched to the focal point for photographic subject 2.

However, the depth of field also has to be considered. If the focal point agreement is accurate within this depth of field, the focal points can be regarded as matching. The depth of field is unambiguously determined by the aperture F value of the interchangeable lens at the time of photography.

Specifically, taking the aperture F value of the interchangeable lens at the time of photography as n, and $\alpha$ as a proportional constant, the depth of field is given by the range $$-\alpha \cdot n < Z < \alpha \cdot n \quad (28).$$

Accordingly, $$|D1 - D2| < \alpha \cdot n \quad (29)$$

and if the focal point of the interchangeable lens is adjusted such that the field shifts by D from the present position, where $$D = 0.5 \cdot (D1 + D2) \quad (30)$$

a photograph will be taken with matching focal point for photographic subject 1 and photographic subject 2. If equation (29) is not satisfied, a warning may be generated; however, if equation (29) is satisfied, the operation of further stopping down of the interchangeable lens is performed.

Although a few preferred embodiments of the invention have been shown and described, it will be appreciated by those skilled in the an that changes may be made in these embodiments, without departing from the principles and the spirit of the invention, the scope of which is defined in the appended claims and their equivalents.

What is claimed is:

1. A focus detection device for a camera which is capable of accommodating an interchangeable lens, comprising:
   (a) focus detection means for performing focus detection in a detection region, and for outputting a focal point position;
   (b) memory means for storing data representing a field curvature of the interchangeable lens, and for storing data representing characteristics of the focus detection means; and
   (c) correction means for correcting the focal point position output by the focus detection means based upon the data stored in the memory means representing the field curvature of the interchangeable lens and based upon the data representing characteristics of the focus detection means.

2. The focus detection device, as recited in claim 1, wherein the data representing the characteristics of the focus detection means is data representing the size of a detection aperture of the focus detection means, a detection direction, and a position of the detection region.

3. The focus detection device as recited in claim 1, wherein the memory means includes a first memory located in the interchangeable lens for storing data representing the field curvature of the interchangeable lens, and a second memory located in the camera for storing data representing the characteristics of the focus detection means.

4. The focus detection device as recited in claim 1, wherein the data representing the field curvature of the interchangeable lens is coefficients of an equation defining field curvature of the interchangeable lens, and the equation is a polynomial having image height as a variable.

5. The focus detection device, as recited in claim 4, wherein the field curvature is a field curvature in a radial direction and in a tangential direction of the interchangeable lens.

6. The focus detection device, as recited in claim 1, wherein the data representing the field curvature of the interchangeable lens is data representing plural field curvatures corresponding to plural stop states of the interchangeable lens.

7. The focus detection device, as recited in claim 6, wherein the field curvature is the field curvature in the radial direction and in the tangential direction of the interchangeable lens.

8. The focus detection device, as recited in claim 6, wherein the data representing the field curvature of the interchangeable lens is coefficients of polynomials which represent field curvature of the interchangeable lens, and the polynomials have image height as a variable.

9. The focus detection device, as recited in claim 1, wherein the detection region is a region within a photographic image surface located in the camera.

10. A camera, comprising:
    (a) a camera body;
    (b) an interchangeable lens mountable on the camera body;
    (c) a focus detection device located in the camera body which performs focus detection for a detection region, and which outputs a focal point position;
    (d) a lens memory located in the interchangeable lens which stores data representing a field curvature of the interchangeable lens;
    (e) a camera memory located in the camera body which stores data representing characteristics of the focus detection device; and
    (f) a correction unit which corrects the focal point position based upon the data stored in the interchangeable lens and the data stored in the camera memory.

11. The camera, as recited in claim 10, wherein the data representing characteristics of the focus detection device is data indicating the size of a detection aperture of the focus detection device, a detection direction, and a position of the detection region.

12. The camera, as recited in claim 10, wherein the data representing the field curvature of the interchangeable lens is coefficients of an equation defining field curvature of the interchangeable lens, and the equation is a polynomial having image height as a variable.

13. The camera, as recited in claim 12, wherein the field curvature is a field curvature in a radial direction and in a tangential direction of the interchangeable lens.

14. The camera, as recited in claim 10, wherein the data representing the field curvature of the interchangeable lens is data representing plural field curvatures corresponding to plural stop states of the interchangeable lens.

15. The camera, as recited in claim 14, wherein the field curvature is the field curvature in the radial direction and in the tangential direction of the interchangeable lens.

16. The camera, as recited in claim 14, wherein the data representing the field curvature of the interchangeable lens is coefficients of polynomials which represent field curvature of the interchangeable lens, and the polynomials have image height as a variable.

17. The camera, as recited in claim 10, wherein the detection region is a region within a photographic image surface located in the camera body.

18. A camera, comprising:
(a) a camera body;
(b) an interchangeable lens mountable on the camera body;
(c) a first focus detection device located in the camera body which performs focus detection in a first detection region, and which outputs a first detected focal point position;
(d) a second focus detection device located in the camera body which performs focus detection in a second detection region, and which outputs a second detected focal point position corresponding to the second detection region;
(e) a lens memory located in the interchangeable lens which stores data representing a field curvature of the interchangeable lens;
(f) a camera memory located in the camera body which stores data representing characteristics of the first detection device, and data representing characteristics of the second detection device; and
(g) a correction unit which corrects the focal point position based upon the data stored in the interchangeable lens and the data stored in the memory located in the camera body.

* * * * *